United States Patent [19]

Burkhard et al.

[11] 4,180,622

[45] Dec. 25, 1979

[54] WEAR RESISTANT COATING FOR THE WORKING FACE OF DISC-SHAPE MACHINE PARTS MADE OF ALUMINUM OR ALUMINUM ALLOYS

[75] Inventors: Kurt Burkhard, Schaffhausen; Peter Kunzmann, Flurlingen, both of Switzerland

[73] Assignee: Swiss Aluminium Ltd., Chippis, Switzerland

[21] Appl. No.: 926,810

[22] Filed: Jul. 21, 1978

[30] Foreign Application Priority Data

Sep. 7, 1977 [CH] Switzerland ............... 10987/77

[51] Int. Cl.$^2$ ............................................. B22F 7/00
[52] U.S. Cl. ............................. 428/564; 192/107 M; 427/419 A; 427/423
[58] Field of Search ................... 428/564, 565; 192/107 R, 107 M; 427/419 A, 423

[56] References Cited

U.S. PATENT DOCUMENTS

| | | | |
|---|---|---|---|
| 3,091,548 | 5/1963 | Dillon | 428/564 |
| 3,371,756 | 3/1968 | Spitz | 192/107 M |
| 3,485,331 | 12/1969 | Volker et al. | 192/107 M |
| 3,584,718 | 6/1971 | Schiefer et al. | 192/107 M |
| 3,837,817 | 9/1974 | Nakamura | 428/564 |
| 4,004,890 | 1/1977 | Kaminsky et al. | 428/564 |

*Primary Examiner*—Brooks H. Hunt
*Attorney, Agent, or Firm*—Bachman and LaPointe

[57] ABSTRACT

A wear resistant coating for the working faces of disc-shaped machine parts made of aluminum or aluminum alloys is applied to the parts by thermal spraying. The coating comprises two components, one being aluminum oxide pure or mixed with another oxide and the other aluminum or an aluminum-silicon or aluminum-magnesium alloy. Such a coating, called a cermet, can be used advantageously on brake discs, clutch plates, and the like.

13 Claims, No Drawings

WEAR RESISTANT COATING FOR THE WORKING FACE OF DISC-SHAPE MACHINE PARTS MADE OF ALUMINUM OR ALUMINUM ALLOYS

BACKGROUND OF THE INVENTION

The invention presented here concerns a wear resistant coating on the working face of disc-shaped machine parts which are made of aluminum of aluminum alloys. In addition, it concerns the use of such coatings on brake discs, in particular those fitted to motorcycles or on clutch plates.

According to the present state of the art, brake discs and clutch plates are manufactured out of steel which is sufficiently wear resistant for the purpose intended. Thus, this material has not needed any kind of special surface treatment. In vehicle manufacture, however, the relatively heavy steel brake discs cause difficulties due to the relatively large unsprung mass which reduces the degree of comfort in driving the vehicle. In the case of clutch plates, the mass should be as little as possible in order to minimize the energy required for its rotation.

For some time now, vehicle and machine manufacturers have wanted to replace the steel by the lighter aluminum. Aluminum, however, has low resistance to frictional wear, and, therefore, the surfaces subjected to frictional contact must be coated with a wear resistant surface. Coating aluminum with steel to improve the wear resistance has in fact been tried, but abandoned again for economic reasons.

SUMMARY OF THE INVENTION

In accordance with the present invention, a wear resistant coating is developed for the working faces of disc-shaped machine parts, such that these machine parts have a minimum weight, offer optimum frictional contact, adequate service life and a minimum cost of manufacture. These coated machine parts, in particular, brake discs and clutch plates, can be produced in large series.

In accordance with the present invention, the working faces of the machine parts are made of thermally deposited or applied cermet coatings wherein the metallic component thereof contains aluminum.

DETAILED DESCRIPTION

There are two components to cermet materials, namely, ceramic and metallic components. The ceramic material to be employed in accordance with the invention must be hard and wear resistant. A wide variety of ceramics may be employed in the cermet coating, with metal oxides having these properties considered as particularly advantageous in this respect. Ceramic oxide materials selected from the group consisting of $Al_2O_3$, $Al_2O_3+TiO_2$, $Al_2O_3+ZrO_2$, $Cr_2O_3$, and $Al_2O_3+Cr_2O_3$ have yielded excellent results. Similarly, a wide variety of aluminum-containing metallic components can be employed in the cermet coating, with the following being particularly advantageous: pure aluminum or an aluminum-silicon or aluminum-magnesium alloy.

One of the methods for producing such cermets is via powder metallurgy; the deposition of cermet layers on substrates of all kinds can be done via known thermal spraying processes, such as flame spraying or plasma spraying.

The ratio of ceramic component to metal component in the cermet can be adjusted to obtain the optimum hardness and ductility of the material. While the ceramic component produces high hardness and wear resistance, the metal component produces ductility and insensitivity to mechanical shock. In the case of wear resistant surfaces, the aim has been to reduce the amount of metal to a level at which the required ductility and insensitivity to shock is just reached. This occurs when the weight ratio of ceramic to metal lies between 90:10 and 60:40. A weight ratio of ceramic to metal of 85:15 to 75:25 is particularly suitable for the preferred cermet composition to be used in accordance with the present invention. These mixtures also exhibit a sufficiently high thermal conductivity to conduct the heat produced by braking to the aluminum on which the coating is situated.

Before depositing the cermet, one can optionally and advantageously deposit an adhesive layer of aluminum, preferably 10–100 $\mu$m thick, in which the cermet is anchored.

Only complete melting of both components of the cermet during the thermal spraying process makes it possible to achieve a high quality wear resistant working surface. Because the ceramic component must be completely melted without causing the metallic component to vaporize, the temperature for thermal application, e.g., spraying, is limited. Choosing a suitable particulate size, for example, 20 to 60 $\mu$m, can prevent vaporization of the metallic component. Plasma spraying equipment advantageously attains the temperature required to melt the ceramic component. Economic production of such brake discs and clutch plates, thus, can readily be achieved if a plasma gun with high output capacity is available. A 200 kW water stabilized plasma gun is particularly suitable for this purpose.

Despite the highly advantageous features of the coating of the present invention, when brake discs, made out of aluminum or an aluminum alloy with holes in the same arrangement as in conventional steel brakes, are coated via the process described above, the coating cannot withstand the shearing forces applied to it. After a relatively short time, cracks form in the deposited coating, starting from the holes in the disc and running radially outwards across the disc.

Our trials showed that these cracks form in particular when two holes on a radius of the disc lie too close together. Surprisingly, this phenomenon of crack formation can be completely suppressed by having a special pattern of holes. When the holes are arranged so that the distance between any two holes is at least 6 mm, and the straight line joining any two holes makes an angle of at least 30° with the radius passing through one of these two holes, no cracking occurs.

Naturally, the number, arrangement and diameter of these holes must not impair the strength of the brake disc or clutch plate. Despite the arrangement described above, the number and diameter of the holes provided were completely of the same order as provided in the normal brake discs made of steel. For reasons of economy, these holes preferably penetrate not only the working faces, but also the whole brake disc.

Instead of holes, a maximum of 20 slits can be provided. The axes of the slits should preferably form an angle of 30° to 60° with a radius drawn through them. Naturally, the dimensions (length and breadth) of the slits, however, must not impair the strength of the disc. In practice, slits, which are 4 to 6 mm wide and in length equal to at most half of the thickness of the disc, have proven very satisfactory.

According to another feature of the invention, the disc-shaped machine parts are used for brake discs, particularly for motorcycles, or for clutch plates, particularly for automobiles. The wear resistant machine parts of the present invention can, however, find a wide variety of advantageous uses, as brake discs in machines for chip-forming metal shaping, for example, for disc brakes for lathes.

Contrary to expectations, brake discs of the present invention in motorcycles do not become so hot that the aluminum melts or loses all its strength properties. Most heavy motor-cycles have two disc brakes on the front wheel, which are in fact so effectively cooled by the air that the aluminum brake discs do not heat up above approximately 300° C., even when applying the brakes fully. The coating of the present invention, particularly with the aluminum alloys used, is able to withstand this thermal load without undesirable loss of strength.

The coating of the present invention can meet the stringent demands made of a brake disc or clutch plate with respect to adhesion and insensitivity to mechanical shock as well. The combination of ceramic oxide phase and metallic phase produces high wear resistance and adequate ductility, while simultaneously meeting the requirement of a high corrosion resistance.

The following examples describe the invention in greater detail.

EXAMPLE I

A brake disc was manufactured from a blank in the form of a flat disc made of a heat and corrosion resistant forgeable aluminum alloy. First, the disc was machined flat and to the required thickness. The outer diameter of this 4.5 mm thick disc was 260 mm, the inner diameter 144 mm.

Sixty holes, 6 mm in diameter, were then drilled in the disc in series of 20 at radial distances of 96, 109 and 122 mm from the center and arranged in such a way that each set of three holes lies on a straight line which forms an angle of 40° with the line of radius drawn through the innermost hole of the set. The flat machined disc was then rotated on an axle and sandblasted on both sides simultaneously with corundum (grain size 0.2–1.2 mm) from two separate nozzles. Blasting continued until a surface roughness of at least Sa 2.5 was achieved.

A 200 kW water stabilized plasma gun then coated the cold disc with material comprising 80% $Al_2O_3$ (particle size 15–40 $\mu$m) and 20% pure aluminum (particle size 20–50 $\mu$m) to provide the wear resistant coating of the present invention.

The thickness of the layer deposited was approximately 500 $\mu$m.

Finally, the disc was ground using a ceramic bonded silicon carbide disc.

EXAMPLE II

The working face of a commercially available clutch plate with an outer diameter of 23 cm and an inner diameter of 18 cm was sandblasted with corundum (particle size 0.2–1.2 mm) until a surface roughness of at least Sa 2.5 was obtained. The disc was then coated and ground as in Example I to provide the wear resistant coating of the present invention.

EXAMPLE III

A brake disc of the same dimensions and with the same arrangement of holes as in Example I was preheated with a Bunsen burner to a temperature of 180° C. A 50 $\mu$m thick layer of aluminum was then deposited on the disc using arc-spraying equipment. The disc was then coated and ground as described in Example I to provide the wear resistant coating of the present invention.

EXAMPLE IV

A brake disc of the same dimensions and with the same arrangement of holes as in Example I was preheated to 180° C. with a Bunsen burner. The disc was then coated and ground as described in Example I.

EXAMPLE V

A brake disc of the same dimensions as in Example I was drilled at radial distances of 96 mm, 109 mm and 122 mm from the center to produce 20 holes at each of these distances and such that two holes at 96 and 122 mm from the center always lie on a straight line that passes through the center and that the holes at 109 mm from the center lie between them. The disc was sandblasted and coated as specified in Example I to provide the wear resistant coating of the present invention, the material deposited by spraying being made up of 60% $Al_2O_3$ (particle size 15–40 $\mu$m) and 40% pure aluminum (particle size 20–50 $\mu$m). The disc was then ground to a surface finish of N 7 according to the Rugo-test No. 1 using a diamond disc bonded with bakelite.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A thermally applied wear resistant coating for the working faces of disc-shaped machine parts made of aluminum or aluminum alloys, said coating comprising a cermet coating wherein the metallic component thereof contains aluminum.

2. A wear resistant coating according to claim 1 wherein the ceramic component of said cermet coating contains metallic oxides.

3. A wear resistant coating according to claim 2 wherein said ceramic component is a material selected from the group consisting of $Al_2O_3$, $Al_2O_3+TiO_2$, $Al_2O_3+ZrO_2$, $Cr_2O_3$, and $Al_2O_3+Cr_2O_3$.

4. A wear resistant coating according to claim 1 wherein the aluminum containing component of said cermet coating is selected from the group consisting of pure aluminum, an aluminum alloy containing silicon and an aluminum alloy containing magnesium.

5. A wear resistant coating according to claim 1 wherein the weight ratio of the ceramic component of said cermet coating to the metal component of said cermet coating lies between 90:10 and 60:40.

6. A wear resistant coating according to claim 5 wherein the weight ratio of ceramic to metal lies between 85:15 and 75:25.

7. A wear resistant coating according to claim 1 wherein the said coating is deposited by plasma spraying.

8. A wear resistant coating according to claim 1 wherein an intermediate adhesive layer is provided between the substrate material and the cermet coating.

9. A wear resistant coating according to claim 8 wherein the adhesive layer is of aluminum and is 10–100 μm thick.

10. A wear resistant coating according to claim 1 wherein the said coating is penetrated by holes which do not have a disadvantageous effect on the disc-shaped machine parts, and which are spaced at least 6 mm apart, wherein a straight line joining any two holes makes an angle of at least 30° to the radius drawn through one of the holes.

11. A wear resistant coating according to claim 1 wherein the said coating is penetrated by slits which do not have a disadvantageous effect on the disc-shaped machine parts, wherein the axis of any of the slits forms an angle of 30° to 60° with a radius passing through the slit in the disc.

12. A wear resistant coating according to claim 1 applied to brake discs.

13. A wear resistant coating according to claim 1 applied to clutch plates.

* * * * *